US010992153B2

United States Patent
Akaishi (10) Patent No.: US 10,992,153 B2
(45) Date of Patent: Apr. 27, 2021

(54) METHOD FOR CORRECTING A CONTROL MAP DEFINING A LIMITING VALUE OF THE CHARGE/DISCHARGE ELECTRIC POWER OF A BATTERY AND BATTERY SYSTEM

(71) Applicant: TOYOTA JIDOSHA KABUSHIKI KAISHA, Toyota (JP)

(72) Inventor: Takayuki Akaishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 16/275,742

(22) Filed: Feb. 14, 2019

(65) Prior Publication Data

US 2019/0267826 A1 Aug. 29, 2019

(30) Foreign Application Priority Data

Feb. 27, 2018 (JP) .............................. JP2018-033589

(51) Int. Cl.
*H02J 7/00* (2006.01)
*H01M 10/44* (2006.01)
(Continued)

(52) U.S. Cl.
CPC .......... *H02J 7/0068* (2013.01); *H01M 10/443* (2013.01); *H01M 10/486* (2013.01);
(Continued)

(58) Field of Classification Search
CPC ........ H02J 7/0068; H02J 7/007; H02J 7/0063; H02J 7/007194; H01M 10/443;
(Continued)

(56) References Cited

U.S. PATENT DOCUMENTS 5,592,070 A * 1/1997 Mino .................. H02J 7/008
320/163
6,255,802 B1 * 7/2001 Shue .................. H01M 10/441
320/132
(Continued)

FOREIGN PATENT DOCUMENTS

| JP | 2007-221885 A | | 8/2007 |
| JP | 2012210083 A | * | 10/2012 |
| KR | 20080032545 A | * | 4/2008 |

OTHER PUBLICATIONS

Official Human Translation of Mizoguchi (JP 2012210083 A) by USPTO (LinguaLinx Language Solutions, Inc.), translated Sep. 22, 2020. (Year: 2012).*

(Continued)

*Primary Examiner* — John T Trischler
(74) *Attorney, Agent, or Firm* — Oliff PLC (57) ABSTRACT

A charge/discharge control method for a battery by a charge/discharge controller of a battery system, includes: acquiring a battery temperature as a measured value by a battery temperature sensor; acquiring an intake air temperature as a measured value by an intake-air temperature sensor; acquiring a current as a measured value by a current sensor; calculating, by referring to predetermined maps, an internal temperature of a battery module and a time constant defining a time until the internal temperature is achieved, the internal temperature and the time constant corresponding to the acquired intake air temperature and the acquired current; correcting a predetermined control map defining a limiting value of a charge/discharge electric power to the battery temperature, at least based on the internal temperature and the time constant; and performing a charge/discharge control on the battery module based on the acquired battery temperature and the corrected control map.

3 Claims, 5 Drawing Sheets

(51) Int. Cl.
  *H01M 10/613* (2014.01)
  *H01M 10/48* (2006.01)
  *H01M 10/625* (2014.01)
  *H01M 10/6561* (2014.01)
(52) U.S. Cl.
  CPC ....... *H01M 10/613* (2015.04); *H01M 10/625* (2015.04); *H01M 10/6561* (2015.04); *H02J 7/007* (2013.01); *H02J 7/0063* (2013.01); H01M 2220/20 (2013.01); H02J 7/0047 (2013.01); H02J 2007/0067 (2013.01)
(58) Field of Classification Search
  CPC ............. H01M 10/613; H01M 10/486; H01M 10/625; H01M 10/6561; H01M 10/441; H01M 10/635; H01M 10/637; H01M 10/6556; H01M 10/633
  USPC ........................................................ 320/134
  See application file for complete search history.

(56) References Cited

U.S. PATENT DOCUMENTS

| | | | | |
|---|---|---|---|---|
| 7,646,176 B2* | 1/2010 | Yamamoto | ............ | H01M 10/48 320/150 |
| 7,958,957 B2* | 6/2011 | Suzuki | ...................... | F01N 3/10 180/65.265 |
| 8,039,136 B2* | 10/2011 | Yamamoto | .............. | B60L 1/003 429/62 |
| 8,395,355 B2* | 3/2013 | Kaita | ........................ | H02J 5/00 320/134 |
| 9,300,154 B2* | 3/2016 | Nishida | ................. | H02J 7/0091 |
| 9,331,507 B2* | 5/2016 | Srinivasan | .......... | H01M 50/581 |
| 9,469,203 B2* | 10/2016 | Momose | ............ | H02J 13/0006 |
| 9,809,224 B2* | 11/2017 | Bito | ...................... | B60W 10/08 |
| 10,439,417 B2* | 10/2019 | Murata | ................. | H02J 7/0042 |
| 2001/0035741 A1* | 11/2001 | Murakami | .......... | H01M 10/443 320/150 |
| 2002/0101220 A1* | 8/2002 | Yang | ...................... | H04N 7/104 320/150 |
| 2002/0158607 A1* | 10/2002 | Yang | ...................... | H02J 7/0091 320/154 |
| 2003/0025477 A1* | 2/2003 | Yang | ................... | H04B 1/1027 320/107 |
| 2003/0197486 A1* | 10/2003 | Yang | ................. | H04N 7/17309 320/112 |
| 2004/0135548 A1* | 7/2004 | Takano | ............ | H02J 7/007192 320/132 |
| 2007/0120537 A1* | 5/2007 | Yamamoto | .......... | H01M 10/613 320/150 |
| 2007/0298315 A1* | 12/2007 | Yamamoto | .............. | B60L 1/003 429/62 |
| 2009/0120699 A1* | 5/2009 | Suzuki | ..................... | F01N 3/106 180/65.265 |
| 2009/0130538 A1* | 5/2009 | Kaita | ..................... | B60L 58/12 429/50 |
| 2010/0019729 A1* | 1/2010 | Kaita | ........................ | H02J 7/02 320/134 |
| 2010/0268475 A1* | 10/2010 | Kusumoto | ......... | G01N 27/3272 702/19 |
| 2012/0293121 A1* | 11/2012 | Horii | .................... | G01R 31/382 320/109 |
| 2013/0162025 A1* | 6/2013 | Momose | ................. | B60L 55/00 307/9.1 |
| 2013/0181684 A1* | 7/2013 | Ueki | ...................... | H01M 10/42 320/162 |
| 2013/0221925 A1* | 8/2013 | Nishida | ................. | H02J 7/0091 320/118 |
| 2013/0264999 A1* | 10/2013 | Srinivasan | .......... | H01M 50/572 320/107 |
| 2013/0298586 A1* | 11/2013 | Hwang | ................... | B60L 50/66 62/239 |
| 2013/0311121 A1* | 11/2013 | Kohno | .................... | H02S 50/00 702/64 |
| 2014/0309824 A1* | 10/2014 | Bito | ...................... | B60W 20/50 701/22 |
| 2015/0236541 A1* | 8/2015 | Takano | ............... | H01M 10/443 320/107 |
| 2015/0258909 A1* | 9/2015 | Kim | ...................... | B60L 58/12 701/36 |
| 2016/0126760 A1* | 5/2016 | Murata | ..................... | B60L 1/02 320/107 |
| 2017/0271984 A1* | 9/2017 | Kohn | ...................... | G05B 15/02 |
| 2018/0079318 A1* | 3/2018 | Ha | .......................... | B60L 58/12 |
| 2019/0078520 A1* | 3/2019 | Inoue | ..................... | F02D 41/0025 |
| 2019/0291598 A1* | 9/2019 | Tsuruta | ................ | B60L 53/20 |
| 2019/0317149 A1* | 10/2019 | Tachibana | .......... | H01M 10/482 |
| 2020/0047634 A1* | 2/2020 | Akaishi | ................ | G01R 31/387 |
| 2020/0254845 A1* | 8/2020 | Miura | ................ | B60H 1/00278 |

OTHER PUBLICATIONS

Office Translation of JP 2012210083A (Year: 2012).*

* cited by examiner

METHOD FOR CORRECTING A CONTROL MAP DEFINING A LIMITING VALUE OF THE CHARGE/DISCHARGE ELECTRIC POWER OF A BATTERY AND BATTERY SYSTEM

INCORPORATION BY REFERENCE

The disclosure of Japanese Patent Application No. 2018-033589 filed on Feb. 27, 2018 including the specification, drawings and abstract is incorporated herein by reference in its entirety.

BACKGROUND

1. Technical Field

The disclosure relates to a charge/discharge control method for a battery, and a battery system to be provided in a vehicle and the like.

2. Description of Related Art

In terms of a battery to be provided in a vehicle and the like, it is preferable to restrain temperature rise so as to restrain deterioration of the battery and to secure safety. In view of this, for example, Japanese Unexamined Patent Application Publication No. 2007-221885 (JP 2007-221885 A) describes a control device configured such that: a control map defining limiting values of a discharging electric power and a charging electric power to battery temperature is prepared; restriction on the discharging electric power and the charging electric power is increased as the battery temperature nears a predetermined limit temperature; and when the battery temperature reaches the limit temperature, charge/discharge is stopped.

Figure 6:
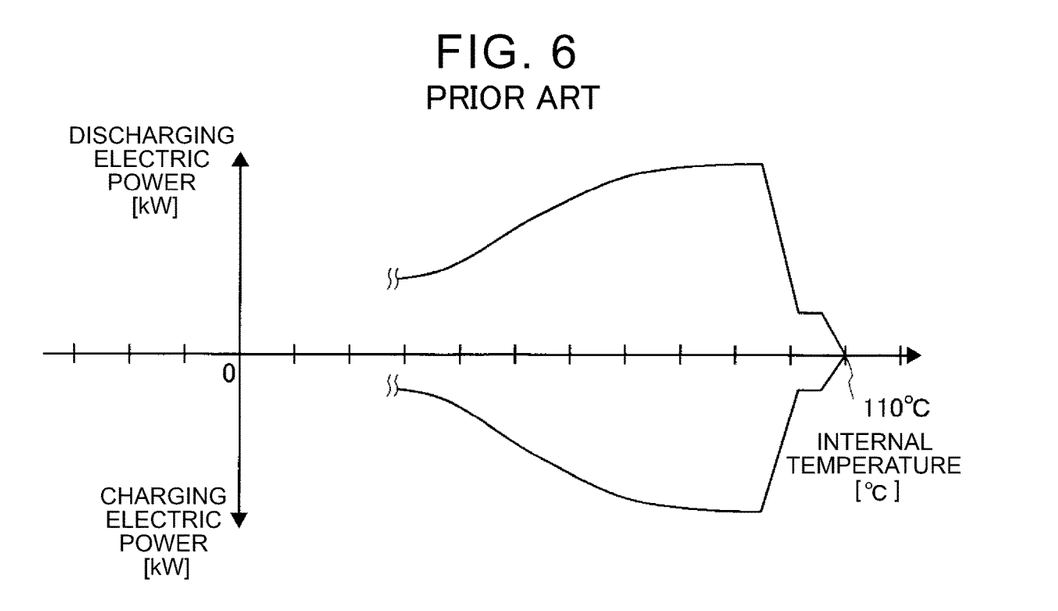
FIG. 6 is a view illustrating a control map in the related art.
Figure 7:
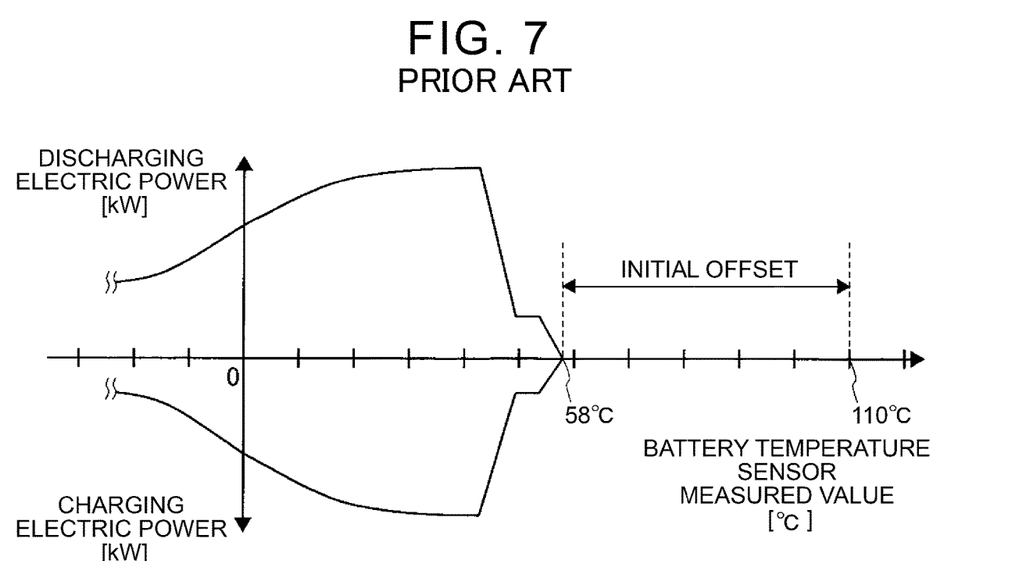
FIG. 7 is a view illustrating a control map in the related art.

An example of such a control map is illustrated in FIG. 6. The horizontal axis of the control map indicates an internal temperature of a battery, and the vertical axis indicates a charging electric power and a discharging electric power. In this example, the limit temperature of the internal temperature of the battery is 110° C. The control map is set such that a maximum temperature at which charge/discharge is performable is the limit temperature or less, and the internal temperature of the battery is set so as not to exceed the limit temperature as long as charge/discharge is performed within the limiting value shown in the control map. As such, the limit temperature of the battery is set with respect to the internal temperature, and the control map is originally set with respect to the internal temperature. However, in practice, it is difficult to measure the internal temperature of the battery, and therefore, the control map is set with respect to a measured value of a battery temperature sensor attached to the surface of a battery cell, such that a value obtained by adding a predetermined offset to the measured value of the battery temperature sensor is taken as the internal temperature, for example. FIG. 7 is a control map obtained such that the horizontal axis of the control map in FIG. 6 is replaced with the measured value of the battery temperature sensor. The measured value of the battery temperature sensor is generally less than the internal temperature due to an effect of thermal diffusion by air cooling and the like, and the control map illustrated in FIG. 7 is shifted from the control map illustrated in FIG. 6 to a low-temperature direction along a temperature axis just by the offset (>0). In an example illustrated in FIG. 7, the offset is 110−58=52 (° C.).

In a control using the control map illustrated in FIG. 7, when an initial control map in which a predetermined fixed value is taken as an initial offset is kept used, the control is performed in such a state where the internal temperature is determined to be higher or lower than an actual value depending on fluctuations in a difference between an actual internal temperature and the measured value of the battery temperature sensor. Particularly, in a case where a large current flows through the battery and the amount of heat generation is large, but the surface of a battery cell is efficiently cooled due to a high air-cooling effect, and therefore, a temperature difference between the actual internal temperature of the battery and a surface temperature thereof is large, the internal temperature is determined to be lower than an actual value. If the initial control map is kept used, the internal temperature might exceed the limit temperature.

Figure 8:
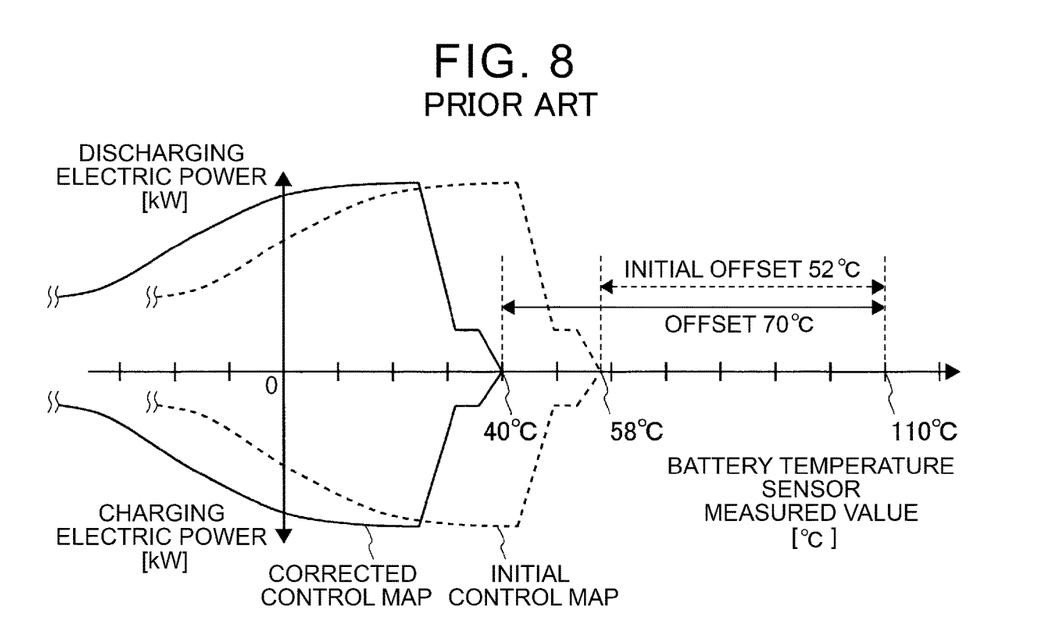
FIG. 8 is a view illustrating a corrected control map in the related art.

The internal temperature of the battery can be estimated from an intake air temperature that is a temperature of air supplied to the battery for cooling and a current load expressed by the square of a current value of the battery. In view of this, it has been conventionally considered that, in a case where the difference between the internal temperature and the measured value of the battery temperature sensor can be determined to be larger than the initial offset based on an estimated value, a correction is made to shift the control map from the initial offset to a further low-temperature direction, so as to avoid a control in which the internal temperature is determined to be lower than an actual temperature. FIG. 8 illustrates the initial control map and a control map obtained by performing such a correction. The offset is 70° C. in the corrected control map and is larger, by 18° C., than the initial offset that is 52° C.

However, the internal temperature estimated based on the intake air temperature and the current load is a saturation value after the intake air temperature and the current load continue for a long time and the internal temperature converges on a given value, and the internal temperature thus estimated is not achieved promptly. Accordingly, if a control based on the corrected control map illustrated in FIG. 8 is performed, a control in which the internal temperature is determined to be higher than an actual temperature is performed. This control is not preferred and may cause such a problem that charge/discharge is restricted needlessly and effective use of the battery is prevented.

SUMMARY

The disclosure provides a charge/discharge control method for a battery and a battery system each of which is able to perform an efficient charge/discharge control without exceeding a limit temperature of the battery.

A first aspect of the disclosure relates to a charge/discharge control method for a battery. The charge/discharge control method is executed by a charge/discharge controller of a battery system. The battery system includes a battery module, a battery temperature sensor configured to measure a temperature of the battery module, a current sensor configured to measure a current flow into and out of the battery module, a cooling duct, an intake-air temperature sensor provided in the cooling duct and configured to measure an intake air temperature that is a temperature of air to be supplied to the battery module, and the charge/discharge controller configured to control a charge/discharge electric power of the battery module. The charge/discharge control method includes: acquiring a battery temperature that is a measured value by the battery temperature sensor; acquiring an intake air temperature that is a measured value by the intake-air temperature sensor; acquiring a current that is a measured value by the current sensor; calculating, by referring to predetermined maps, an internal temperature of the battery module and a time constant defining a time until the internal temperature is achieved, the internal temperature and the time constant corresponding to the acquired intake air temperature and the acquired current; correcting a predetermined control map defining a limiting value of the charge/discharge electric power with respect to the battery temperature, at least based on the internal temperature and the time constant; and performing a charge/discharge control on the battery module based on the acquired battery temperature and the corrected control map.

Thus, the control map to be used for restriction on charge/discharge is suitably corrected by use of the time constant. Hereby, at the time when charge/discharge is controlled so that the internal temperature of the battery does not exceed a limit temperature, effective use of the battery can be achieved without restricting charge/discharge more than required.

Further, when the internal temperature is larger than a predetermined limit temperature, the charge/discharge controller may calculate a predicted increment of the temperature in the battery module based on the internal temperature and the time constant, and correct the predetermined control map by shifting the predetermined control map to a low temperature side with respect to the battery temperature only by the calculated predicted increment. The predicted increment is an increment that is predicted to be achieved during a predetermined time.

Hereby, the control map can be corrected only by a particularly suitable correction amount.

A second aspect of the disclosure relates to a battery system including a battery module, a battery temperature sensor, a current sensor, a cooling duct, an intake-air temperature sensor, and a charge/discharge controller. The battery temperature sensor is configured to measure a temperature of the battery module. The current sensor is configured to measure a current flow into and out of the battery module. The intake-air temperature sensor is provided in the cooling duct and is configured to measure an intake air temperature that is a temperature of air to be supplied to the battery module. The charge/discharge controller is configured to a control charge/discharge electric power of the battery module. The charge/discharge controller acquires a battery temperature that is a measured value by the battery temperature sensor, an intake air temperature that is a measured value by the intake-air temperature sensor, and a current that is a measured value by the current sensor. The charge/discharge controller calculates, by referring to predetermined maps, an internal temperature of the battery module and a time constant defining a time until the internal temperature is achieved, the internal temperature and the time constant corresponding to the acquired intake air temperature and the acquired current. The charge/discharge controller corrects a predetermined control map defining a limiting value of the charge/discharge electric power with respect to the battery temperature, at least based on the internal temperature and the time constant. The charge/discharge controller performs a charge/discharge control on the battery module based on the acquired battery temperature and the corrected control map.

Thus, the control map to be used for restriction on charge/discharge is suitably corrected by use of the time constant. Hereby, at the time when charge/discharge is controlled so that the internal temperature of the battery does not exceed a limit temperature, effective use of the battery can be achieved without restricting charge/discharge more than required.

According to the aspects of the disclosure, the control map to be used for restriction on charge/discharge can be suitably corrected by use of the time constant as described above. Particularly, the control map is corrected by an estimated value after a predetermined time elapses, calculated by the time constant, without using an estimated value after the internal temperature converges. Accordingly, it is possible to provide a charge/discharge control method for a battery and a battery system each of which is able to perform an efficient charge/discharge control without exceeding a limit temperature of the battery and without restricting charge/discharge more than required.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Outline

In a charge/discharge control method for a battery according to the disclosure, by use of a control map that defines limiting values of a discharging electric power and a charging electric power with respect to a battery temperature sensor value, a charge/discharge control is performed so that an internal temperature of the battery does not to exceed a limit temperature. The control map is corrected based on an estimated value of the internal temperature, the estimated value being determined based on an intake air temperature and a current load. A correction amount is determined by an estimated value after a predetermined time elapses, calculated based on a predetermined time constant, without using an estimated value after convergence like the related art. This makes it possible to restrain charge/discharge from being controlled more than required.

Embodiment

The following describes one embodiment of the disclosure in detail with reference to the drawings.

Configuration

Figure 1:
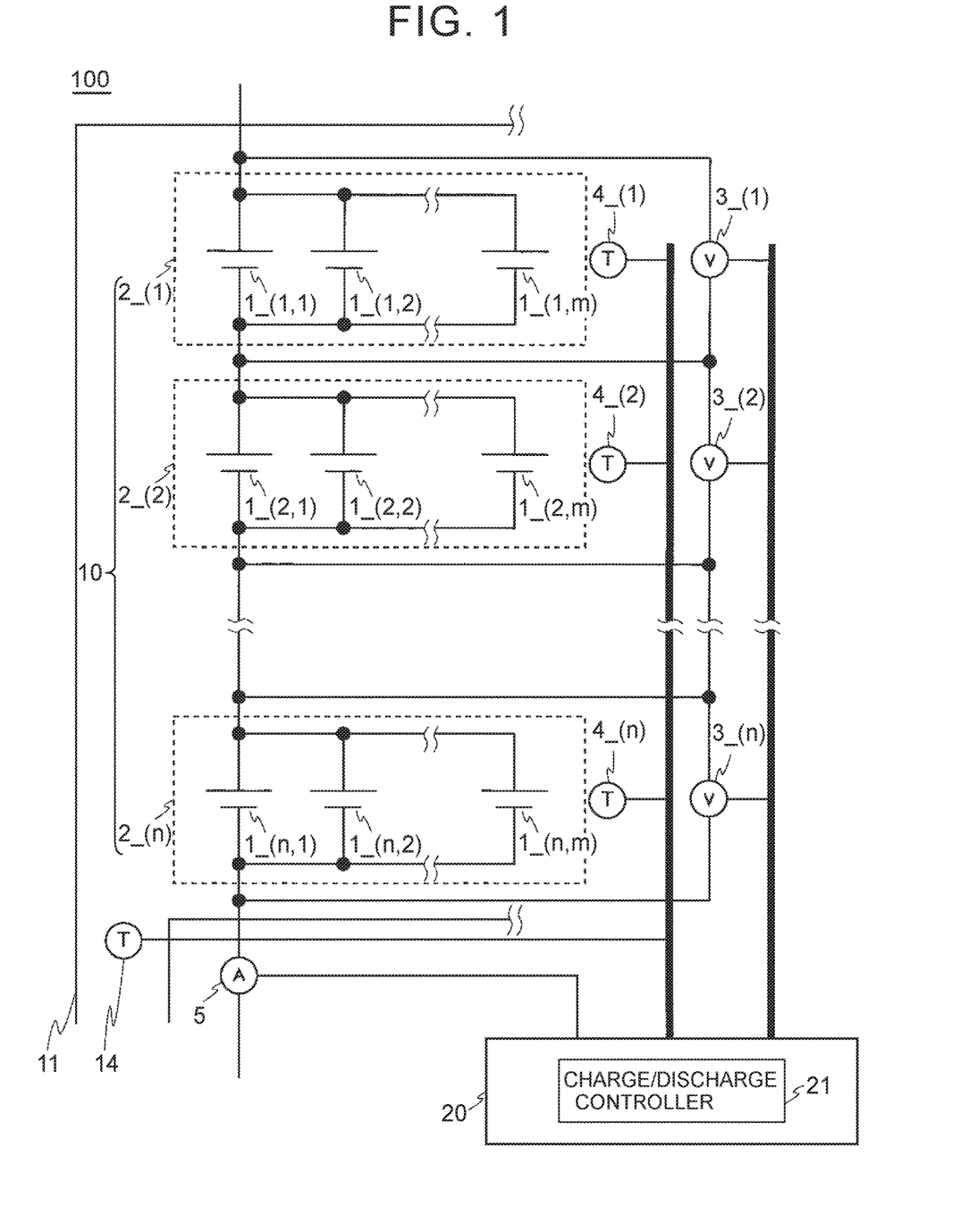
FIG. 1 is a functional block diagram of a battery system according to one embodiment of the present disclosure.

FIG. 1 is a functional block diagram of a battery system 100 according to the present embodiment. The battery system 100 includes a battery module 10, voltage sensors 3, battery temperature sensors 4, a current sensor 5, a cooling duct 11, an intake-air temperature sensor 14, and a battery monitoring ECU 20, as one example. The battery module 10 includes a plurality of (n pieces of) parallel circuits 2 (2_(1) to 2_(n)) connected in series, as one example. Each of the parallel circuits 2 includes a plurality of (m pieces of) cells 1 (1_(1, 1) to 1_(1, m), . . . , 1_(n, 1) to 1_(n, m)) connected in parallel. The voltage sensors 3 (3_(1) to 3_(n)) measure respective voltages of the parallel circuits 2. Each of the battery temperature sensors 4 (4_(1) to 4_(n)) is provided, for example, on a surface of any one of the cells 1 in a corresponding parallel circuit 2, at a position where a maximum surface temperature of the cells 1 can be acquired, so as to measure a temperature of the corresponding parallel circuit 2. A plurality of battery temperature sensors 4 may be provided in one parallel circuit 2. The current sensor 5 measures a current of the battery module 10. Further, the cooling duct 11 takes intake air for cooling and supplies it to the battery module 10. The intake-air temperature sensor 14 measures an intake air temperature. The configuration of the battery module 10 is an example, and the number of cells 1 and the arrangement structure of the cells 1 are not particularly limited. Further, the voltage sensors 3 may be omitted.

Figure 2:
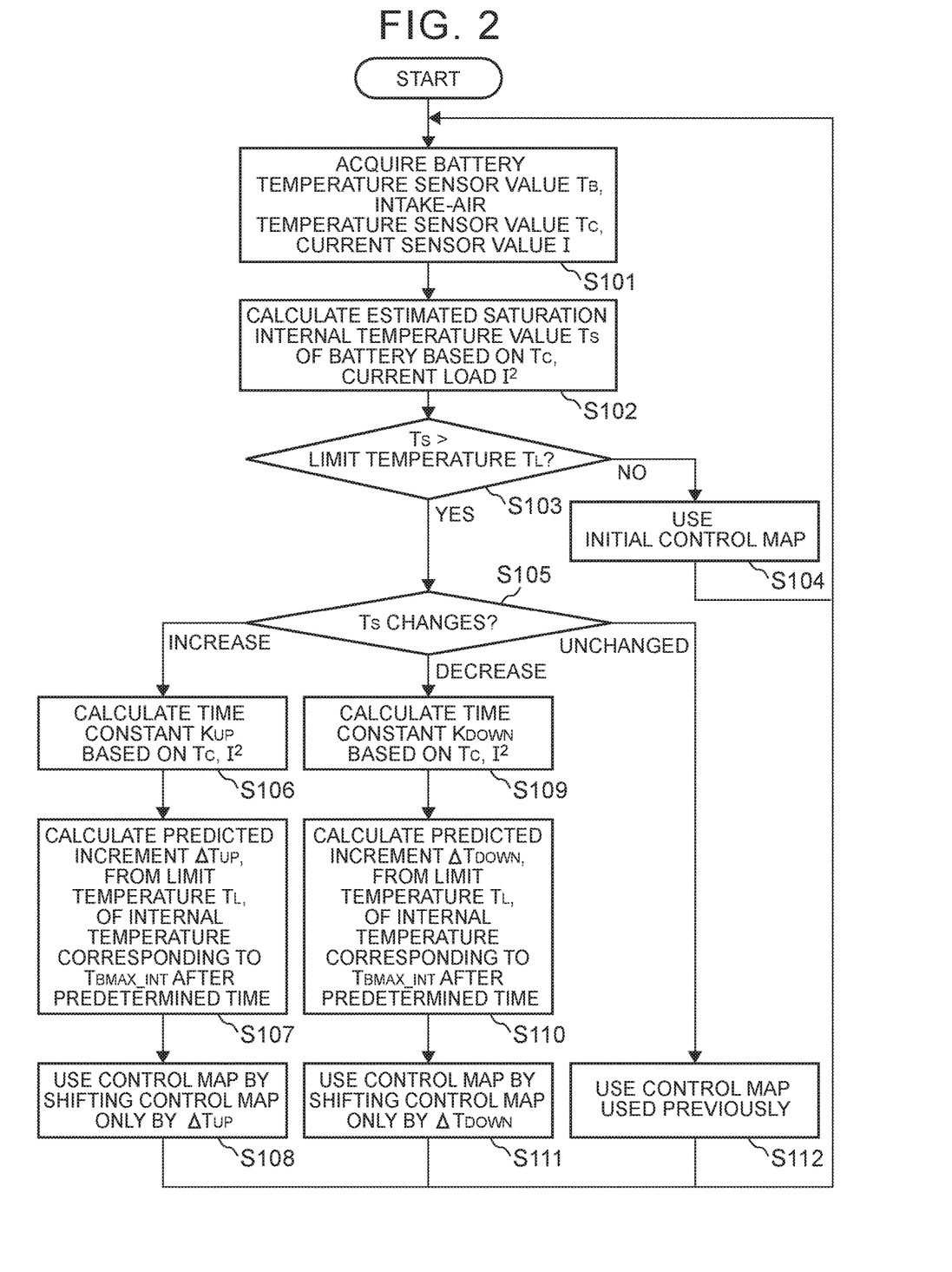
FIG. 2 is a flowchart illustrating a process of a charge/discharge controller according to one embodiment.

The battery monitoring ECU 20 is an electronic control unit (ECU) configured to control the battery module 10, as one example. The battery monitoring ECU 20 includes a charge/discharge controller 21 configured to acquire measured values from the voltage sensors 3, the battery temperature sensors 4, the current sensor 5, and the intake-air temperature sensor 14, so as to perform a charge/discharge control of the battery module 10 based on the measured values. The battery monitoring ECU 20 may include other controllers for controlling various functions of the battery module 10, in addition. Process The following describes a charge/discharge control process executed by the charge/discharge controller 21 of the battery system 100. FIG. 2 is a flowchart to describe the charge/discharge control process. The process is started, for example, when a vehicle starts running and charge/discharge of the battery module 10 is started.

Step S101

The charge/discharge controller 21 acquires sensor values from the battery temperature sensors 4 and sets a maximum value among them as a battery temperature sensor value $T_B$, as one example. Further, the charge/discharge controller 21 acquires an intake-air temperature sensor value $T_C$ from the intake-air temperature sensor 14. Further, the charge/discharge controller 21 acquires a current sensor value I from the current sensor 5.

Step S102

The charge/discharge controller 21 calculates an estimated saturation internal temperature value $T_S$ in each cell 1 based on a current load $I^2$ expressed as the square of the current sensor value I and the intake-air temperature sensor value $T_C$. The estimated saturation internal temperature value $T_S$ is an estimated value when a surface temperature of each cell 1 is an allowable upper limit temperature value $T_{BMAX\_INT}$ (described later), for example, and the internal temperature converges on a given value under a given current load $I^2$ and a given intake-air temperature sensor value $T_C$. The estimated saturation internal temperature value $T_S$ can be calculated referring to, for example, a table as illustrated in Table 1 below that is prepared in advance by measurement or the like. Note that values illustrated in Table 1 are examples.

TABLE 1

| INTAKE AIR TEMPERATURE | ESTIMATED SATURATION INTERNAL TEMPERATURE VALUE $T_S$ | | | | | | | |
|---|---|---|---|---|---|---|---|---|
| | CURRENT LOAD $I^2$ | | | | | | | |
| [° C.] | 0 | 1000 | 2000 | 3000 | 6000 | 10000 | 15000 | 20000 |
| −30 | 78.9 | 99.2 | 107.8 | 114.4 | 129.3 | 144.2 | 159.1 | 171.6 |
| −25 | 78.2 | 97.6 | 105.9 | 112.2 | 126.6 | 140.9 | 155.2 | 167.3 |
| −20 | 77.5 | 96.1 | 104.0 | 110.1 | 123.9 | 137.7 | 151.4 | 163.0 |
| −15 | 76.8 | 94.5 | 102.1 | 108.0 | 121.2 | 134.4 | 147.6 | 158.7 |
| −10 | 76.1 | 92.9 | 100.2 | 105.8 | 118.5 | 131.2 | 143.8 | 154.4 |
| −5 | 74.8 | 90.7 | 97.7 | 103.1 | 115.2 | 127.3 | 139.4 | 149.5 |
| 0 | 73.5 | 88.5 | 95.2 | 100.3 | 111.9 | 123.4 | 134.9 | 144.6 |
| 5 | 72.9 | 87.1 | 93.4 | 98.3 | 109.3 | 120.3 | 131.2 | 140.5 |
| 10 | 72.4 | 85.7 | 91.7 | 96.3 | 106.7 | 117.2 | 127.6 | 136.3 |
| 15 | 71.8 | 84.2 | 89.9 | 94.3 | 104.2 | 114.0 | 123.9 | 132.2 |
| 20 | 71.2 | 82.8 | 88.1 | 92.3 | 101.6 | 110.9 | 120.2 | 128.0 |
| 25 | 70.7 | 81.4 | 86.4 | 90.3 | 99.0 | 107.8 | 116.5 | 123.9 |
| 30 | 70.1 | 79.9 | 84.6 | 88.2 | 96.5 | 104.7 | 112.8 | 119.7 |
| 35 | 69.6 | 78.5 | 82.8 | 86.2 | 93.9 | 101.5 | 109.1 | 115.6 |
| 40 | 69.0 | 77.0 | 81.1 | 84.2 | 91.3 | 98.4 | 105.5 | 111.4 |
| 45 | 68.4 | 76.3 | 80.3 | 83.4 | 90.4 | 97.4 | 104.4 | 110.2 |
| 50 | 67.9 | 75.8 | 79.8 | 82.8 | 89.9 | 96.8 | 103.8 | 109.7 |
| 55 | 67.3 | 75.2 | 79.2 | 82.3 | 89.3 | 96.3 | 103.3 | 109.1 |
| 60 | 66.8 | 74.7 | 78.7 | 81.7 | 88.8 | 95.7 | 102.7 | 108.6 |

Step S103

The charge/discharge controller 21 determines whether or not the estimated saturation internal temperature value $T_S$ is larger than a limit temperature $T_L$. The limit temperature $T_L$ is an allowable upper limit value of the internal temperature of each cell 1. When the estimated saturation internal temperature value $T_S$ is higher than the limit temperature $T_L$, the process proceeds to step S105, and when the estimated saturation internal temperature value $T_S$ is the limit temperature $T_L$ or less, the process proceeds to step S104.

Step S104

Figure 3:
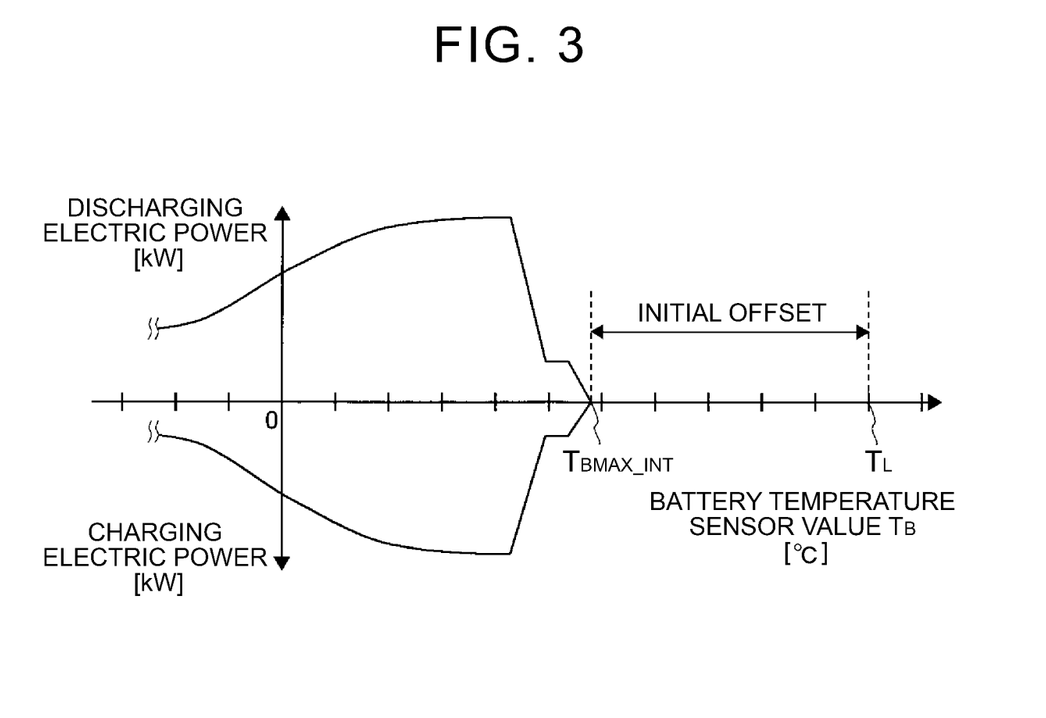
FIG. 3 is a view illustrating an initial control map according to one embodiment of the disclosure.

The charge/discharge controller 21 performs a charge/discharge control on the battery module 10 by use of a predetermined initial control map. As illustrated in FIG. 3, the initial control map is a control map that defines limiting values of a discharging electric power and a charging electric power with respect to the battery temperature sensor value $T_B$. In the initial control map, a temporary initial offset is given so that an internal temperature corresponding to the allowable upper limit temperature value $T_{BMAX\_INT}$ that is an upper limit value of a battery temperature sensor value at which charge/discharge is performable becomes the limit temperature $T_L$ or a value less than the limit temperature $T_L$ but closer to the limit temperature $T_L$, for example, in a general use state of the battery module 10. In this step, since the estimated saturation internal temperature value $T_S$ is the limit temperature $T_L$ or less, the charge/discharge controller 21 continues the charge/discharge control based on the initial control map. Then, the process returns to step S101.

Step S105

The charge/discharge controller 21 determines whether the estimated saturation internal temperature value $T_S$ is increasing, decreasing, or unchanged. The process is performed repeatedly as will be described later. Accordingly, at the time of execution of the process of the second time or later, the determination can be made by comparing a latest estimated saturation internal temperature value $T_S$ with a immediately preceding estimated saturation internal temperature value $T_S$. At the time of the first execution, it is determined that the estimated saturation internal temperature value $T_S$ is increasing, for example. When the estimated saturation internal temperature value $T_S$ is increasing, the process proceeds to step S106. When the estimated saturation internal temperature value $T_S$ is decreasing, the process proceeds to step S109. When the estimated saturation internal temperature value $T_S$ is unchanged, the process proceeds to step S112.

Step S106

The charge/discharge controller 21 calculates a time constant $K_{UP}$ at the time of temperature rise based on the current load $I^2$ and the intake-air temperature sensor value $T_C$. The time constant $K_{UP}$ is a constant defining a time until the internal temperature corresponding to the allowable upper limit temperature value $T_{BMAX\_INT}$ in the initial map rises and reaches the estimated saturation internal temperature value $T_S$, based on the current load $I^2$ and the intake-air temperature sensor value $T_C$. For example, the time constant $K_{UP}$ can be calculated such that a table as illustrated in Table 2 below is prepared in advance by measurement or the like and the table is referred to, for example. Note that values illustrated in Table 2 are examples.

TABLE 2

TIME CONSTANT $K_{UP}$

| INTAKE AIR TEMPERATURE | CURRENT LOAD $I^2$ | | | | | |
|---|---|---|---|---|---|---|
| [° C.] | 0 | 1000 | 2000 | 3000 | 4000 | ... |
| −30 | 400 | 350 | 300 | 250 | 200 | ... |
| −10 | 350 | 310 | 270 | 230 | 180 | ... |
| 0 | 300 | 250 | 200 | 150 | 140 | ... |
| 10 | 200 | 180 | 160 | 140 | 120 | ... |
| 20 | 100 | 80 | 70 | 60 | 50 | ... |
| 30 | 50 | 50 | 40 | 30 | 20 | ... |
| 40 | 20 | 20 | 20 | 15 | 10 | ... |
| ... | ... | ... | ... | ... | ... | ... |

Step S107

Figure 4:
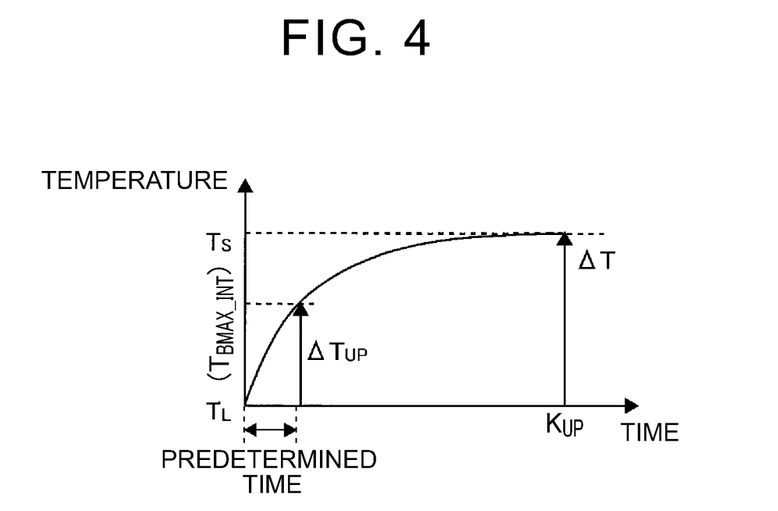
FIG. 4 is a view illustrating an increase model of a battery internal temperature corresponding to an allowable upper limit temperature value of the initial control map according to one embodiment of the disclosure.

The charge/discharge controller 21 calculates a difference $\Delta T = T_S - T_L$ between the estimated saturation internal temperature value $T_S$ and the limit temperature $T_L$. Based on the difference and the time constant $K_{UP}$, the charge/discharge controller 21 calculates a predicted value $\Delta T_{UP}$ of an increment, from the limit temperature $T_L$, of the internal temperature corresponding to the allowable upper limit temperature value $T_{BMAX\_INT}$ after a predetermined time elapses. The predicted value $\Delta T_{UP}$ is a value smaller than an increasing amount $\Delta T$ at the time when the internal temperature converges, as indicated by a temperature rise model illustrated in FIG. 4. The predicted value $\Delta T_{UP}$ indicates an excess, from the limit temperature $T_L$, of the internal temperature corresponding to the allowable upper limit temperature value $T_{BMAX\_INT}$ after the predetermined time elapses, when the current load $I^2$ and the intake-air temperature sensor value $T_C$ continue under the charge/discharge control by the initial control map.

Step S108

Figure 5:
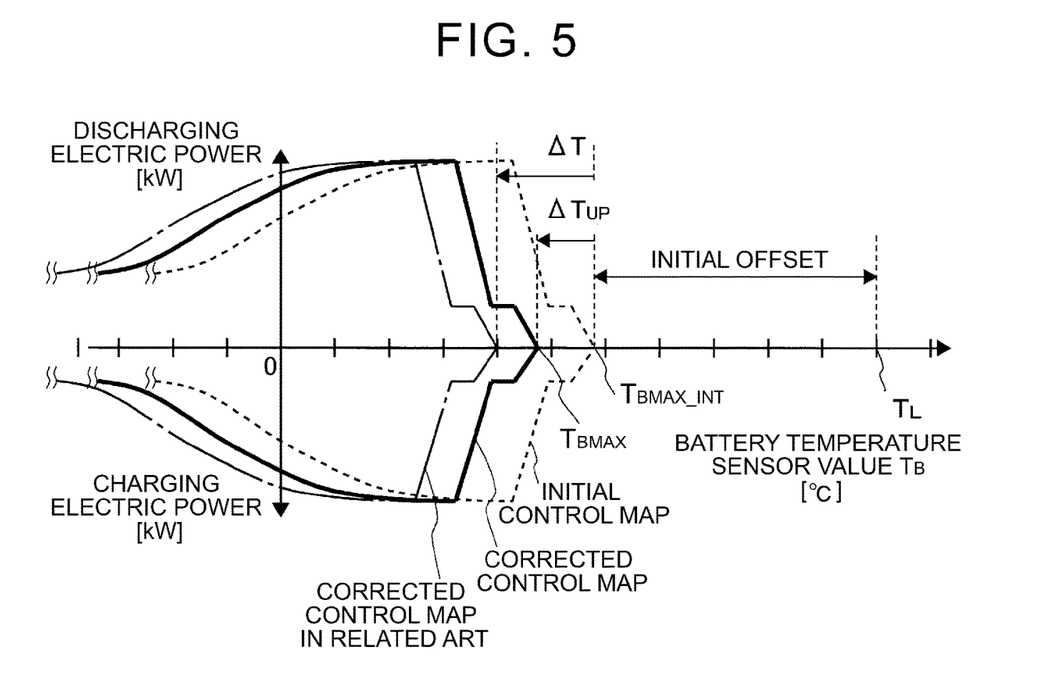
FIG. 5 is a view illustrating an example of a corrected control map according to one embodiment of the disclosure.

As illustrated in FIG. 5, the charge/discharge controller 21 generates a corrected control map by shifting the initial control map to a low temperature side only by $\Delta T_{UP}$. In the corrected control map, an internal temperature corresponding to an allowable upper limit temperature value $T_{BMAX}$ after the predetermined time elapses is the limit temperature $T_L$ at the maximum. The charge/discharge controller 21 performs a charge/discharge control based on the battery temperature sensor value $T_B$ and the corrected control map thus generated. Hereby, charge/discharge is more strictly restricted than when the charge/discharge is controlled based on the initial control map, so that an increase of the internal temperature of each cell 1 is restrained and the internal temperature after the predetermined time elapses from the present becomes the limit temperature $T_L$ or less. Then, the process returns to step S101. FIG. 5 illustrates a control map obtained by shifting the initial control map only by the difference $\Delta T$ between the estimated saturation internal temperature value $T_S$ and the limit temperature $T_L$. This is the same as the corrected control map in the related art as illustrated in FIG. 8. As illustrated in FIG. 5, in the corrected control map according to the present embodiment, a map shift amount for correction is reduced in comparison with that in the related art. Accordingly, charge/discharge is not restricted more than required and effective use of the battery can be performed.

Step S109

The charge/discharge controller 21 calculates a time constant $K_{DOWN}$ at the time of temperature drop based on the current load $I^2$ and the intake-air temperature sensor value $T_C$. Similarly to $K_{UP}$, the time constant $K_{DOWN}$ is a constant prescribing a time until the internal temperature corresponding to the allowable upper limit temperature value $T_{BMAX\_INT}$ in the initial map rises and reaches the estimated saturation internal temperature value $T_S$, based on the current load $I^2$ and the intake-air temperature sensor value $T_C$. The time constant $K_{DOWN}$ can be calculated similarly to $K_{UP}$ such that a table is prepared in advance and the table is referred to, for example. Note that a case where the estimated saturation internal temperature value $T_S$ is decreasing and a case where the estimated saturation internal temperature value $T_S$ is increasing generally have different speeds until the internal temperature reaches the estimated saturation internal temperature value $T_S$, even at the same current load $I^2$ and the same intake-air temperature sensor value $T_C$. Therefore, the value of $K_{DOWN}$ is different from the value of $K_{UP}$, although not illustrated herein.

Step S110

Similarly to step S107, the charge/discharge controller 21 calculates a difference $\Delta T=T_S-T_L$ between the estimated saturation internal temperature value $T_S$ and the limit temperature $T_L$. Based on the difference $\Delta T$ and the time constant $K_{DOWN}$, the charge/discharge controller 21 calculates a predicted value $\Delta T_{DOWN}$ of an increment, from the limit temperature TL, of the internal temperature corresponding to the allowable upper limit temperature value $T_{BMAX\_INT}$ after a predetermined time elapses from the present. Similarly to the predicted value $\Delta T_{UP}$, the predicted value $\Delta T_{DOWN}$ is a value smaller than the increasing amount $\Delta T$ at the time when the internal temperature converges, although not illustrated herein.

Step S111

Similarly to step S108, the charge/discharge controller 21 generates a corrected control map by shifting the initial control map to a low temperature side only by $\Delta T_{DOWN}$. In the corrected control map, an internal temperature corresponding to an allowable upper limit temperature value $T_{BMAX}$ after the predetermined time elapses is the limit temperature $T_L$ at the maximum. The charge/discharge controller 21 performs a charge/discharge control based on the battery temperature sensor value $T_B$ and the corrected control map thus generated. Hereby, charge/discharge is more strictly restricted than the initial control map, so that an increase of the internal temperature of each cell 1 is restrained and the internal temperature after the predetermined time elapses is the limit temperature $T_L$ or less. Then, the process returns to step S101. Although not illustrated herein, in the corrected control map in this step, a map shift amount for correction is reduced in comparison with that in the related art, similarly to the corrected control map in step S108. Accordingly, charge/discharge is not restricted more than required and effective use of the battery can be performed.

Step S112

In this step, since the estimated saturation internal temperature value $T_S$ is unchanged from a previous value, a shift amount from the initial control map may be set to the same as $\Delta T_{UP}$ calculated in step S107 or $\Delta T_{DOWN}$ calculated in step S110. Accordingly, in this step, the charge/discharge controller 21 performs a charge/discharge control based on the battery temperature sensor value $T_B$ and the corrected control map used in a previous control. Hereby, charge/discharge is more strictly restricted than the initial control map to the same extent as the previous control, so that an increase of the internal temperature of each cell 1 is restrained and the internal temperature after the predetermined time elapses becomes the limit temperature $T_L$ or less. Then, the process returns to step S101. Further, similarly to steps S108, S111, charge/discharge is not restricted more than required and effective use of the battery can be performed.

As described above, this process is performed repeatedly during charge/discharge of the battery module 10, for example. It is preferable that a cycle period be shorter than the predetermined time to be used for the calculation of $\Delta T_{UP}$ and $\Delta T_{DOWN}$, so that the shift amount of the control map can be updated by a period shorter than the predetermined time. Further, two types of time constants $K_{UP}$ and $K_{DOWN}$ are used as the time constant in the above example. However, the disclosure is not limited to this, and one time constant may be used or different time constants may be used properly based on other conditions.

The disclosure is not limited to the above embodiment and is performable with appropriate modifications. For example, the steps may be changed appropriately, provided that, when it is determined that the difference between the internal temperature of the battery and the battery temperature sensor value increases, a predicted increment with an appropriate difference can be calculated based on a time constant, and a correction to shift a predetermined control map to a low temperature side only by a suitable amount corresponding to the predicted increment on a battery temperature sensor axis can be performed.

Effects

According to the disclosure, a control map to be used for restriction on charge/discharge can be preferably corrected by use of a time constant. Especially, the control map is corrected by an estimated value after a predetermined period elapses, without using an estimated value obtained after an internal temperature converges. Accordingly, at the time when charge/discharge is controlled so that the internal temperature of a battery does not exceed a limit temperature, effective use of the battery can be achieved without restricting charge/discharge more than required.

Note that the disclosure can be regarded not only as the charge/discharge control method for the battery, but also as a charge/discharge control program executed by a computer, or a battery system or a vehicle including such a computer.

The disclosure is useful for a vehicle and the like provided with a battery.

What is claimed is:

1. A charge/discharge control method for a battery, the charge/discharge control method being executed by a charge/discharge controller of a battery system including
   a battery module,
   a battery temperature sensor configured to measure a temperature of the battery module,
   a current sensor configured to measure a current flow into and out of the battery module,
   a cooling duct,
   an intake-air temperature sensor provided in the cooling duct and configured to measure an intake air temperature that is a temperature of air to be supplied to the battery module, and
   the charge/discharge controller configured to control a charge/discharge electric power of the battery module,
   the charge/discharge control method comprising:
   acquiring a battery temperature that is a measured value by the battery temperature sensor;
   acquiring an intake air temperature that is a measured value by the intake-air temperature sensor;
   acquiring a current that is a measured value by the current sensor;
   calculating, by referring to predetermined maps, an internal temperature of the battery module and a time constant, the time constant defining a time until the internal temperature reaches a saturation internal temperature value, the internal temperature and the time constant being based on the acquired intake air temperature and the acquired current;
   correcting a predetermined control map defining a limiting value of the charge/discharge electric power with respect to the battery temperature, at least based on the internal temperature and the time constant; and
   performing a charge/discharge control on the battery module based on the acquired battery temperature and the corrected control map.

2. The charge/discharge control method according to claim 1, wherein, when the internal temperature is larger than a predetermined limit temperature, the charge/discharge controller calculates a predicted increment of the temperature in the battery module based on the internal temperature and the time constant, and corrects the predetermined control map by shifting the predetermined control map to a low temperature side with respect to the battery temperature only by the calculated predicted increment, the predicted increment being an increment that is predicted to be achieved during a predetermined time.

3. A battery system comprising:
   a battery module;
   a battery temperature sensor configured to measure a temperature of the battery module;
   a current sensor configured to measure a current flow into and out of the battery module;
   a cooling duct,
   an intake-air temperature sensor provided in the cooling duct and configured to measure an intake air temperature that is a temperature of air to be supplied to the battery module, and
   a charge/discharge controller configured to control a charge/discharge electric power of the battery module, wherein:
   the charge/discharge controller acquires a battery temperature that is a measured value by the battery temperature sensor, an intake air temperature that is a measured value by the intake-air temperature sensor, and a current that is a measured value by the current sensor;
   the charge/discharge controller calculates, by referring to predetermined maps, an internal temperature of the battery module and a time constant, the time constant defining a time until the internal temperature reaches a saturation internal temperature value, the internal temperature and the time constant being based on the acquired intake air temperature and the acquired current;
   the charge/discharge controller corrects a predetermined control map defining a limiting value of the charge/discharge electric power with respect to the battery temperature, at least based on the internal temperature and the time constant; and
   the charge/discharge controller performs a charge/discharge control on the battery module based on the acquired battery temperature and the corrected control map.

* * * * *